United States Patent [19]

Hattori et al.

[11] Patent Number: 5,571,874
[45] Date of Patent: Nov. 5, 1996

[54] METHOD OF PRODUCING MOLECULAR COMPOSITE MATERIAL INCLUDING RIGID AROMATIC POLYMER

[75] Inventors: Tatsuya Hattori, Tokyo; Kazuhiro Kagawa; Hiroshi Akita, both of Asaka; Hiroto Kobayashi, Tokorozawa, all of Japan

[73] Assignee: Honda Giken Kogyo Kabushiki Kaisha, Tokyo, Japan

[21] Appl. No.: 293,318

[22] Filed: Aug. 22, 1994

[30] Foreign Application Priority Data

Nov. 26, 1993 [JP] Japan ................................. 5-321153

[51] Int. Cl.$^6$ ........................... C08L 77/00; C08G 69/48
[52] U.S. Cl. ...................... 525/420; 525/425; 525/432; 525/434; 525/435
[58] Field of Search ........................... 525/417, 410, 525/432, 420, 425, 434, 435

[56] References Cited

U.S. PATENT DOCUMENTS

| | | | |
|---|---|---|---|
| 4,108,835 | 8/1978 | Arnold et al. | 528/183 |
| 5,068,292 | 11/1991 | Lenke et al. | 525/509 |
| 5,151,472 | 9/1992 | Valia | 525/432 |
| 5,159,029 | 10/1992 | Pater et al. | 525/421 |
| 5,223,588 | 6/1993 | Lenke et al. | 525/509 |
| 5,248,759 | 9/1993 | Akita et al. | 528/337 |
| 5,288,842 | 2/1994 | Feger et al. | 528/335 |

FOREIGN PATENT DOCUMENTS

| | | |
|---|---|---|
| 0298753 | 1/1989 | European Pat. Off. . |
| 0346017 | 12/1989 | European Pat. Off. . |
| 0457419 | 11/1991 | European Pat. Off. . |
| 0616000 | 9/1994 | European Pat. Off. . |
| 64-1761 | 1/1989 | Japan . |
| 64-1760 | 1/1989 | Japan . |
| 1287167 | 11/1989 | Japan . |
| 27976 | 2/1990 | Japan . |
| 4114062 | 4/1992 | Japan . |

OTHER PUBLICATIONS

"Nylon 6/Polyisocyanurate Interpenetrating Polymer Networks (IPNs)" by Wally L. Chang et al, *Journal of Polymer Science: Part A: Polymer Chemistry*, vol. 27, 3619–3635 (1989).

*Primary Examiner*—Ana L. Carrillo
*Attorney, Agent, or Firm*—Birch, Stewart, Kolasch & Birch, LLP

[57] ABSTRACT

A molecular composite material having excellent properties such as mechanical strength, heat resistance, solvent resistance, etc. is produced by dissolving a prepolymer of a rigid aromatic polymer in a monomer of a matrix polymer to form a homogeneous solution and then heating the homogeneous solution to cause a thiazole ring closure reaction of the prepolymer and a polymerization reaction of the monomer.

26 Claims, No Drawings

METHOD OF PRODUCING MOLECULAR COMPOSITE MATERIAL INCLUDING RIGID AROMATIC POLYMER

BACKGROUND OF THE INVENTION

The present invention relates to a method of producing a molecular composite material comprising a rigid aromatic polymer and a matrix polymer, and more particularly to a method of producing a molecular composite material having excellent dispersibility, mechanical strength, etc. substantially without using a solvent.

Recently, to achieve the reduction of weight of aircraft, automobiles, etc., plastic materials called "engineering plastics" having excellent mechanical properties, heat resistance, etc. have been increasingly used. Apart from this, development has been actively carried out to provide composite materials such as FRPs consisting of plastic materials and high-strength, high-modulus fibers such as carbon fibers, and these composite materials are being used in many applications.

It is known that the strength of these composite materials largely depends not only on the strength of plastics and reinforcing fibers but also on the interfacial bonding strength of the fibers to the matrix resins. Also, the impregnating capability of matrix resins into the fiber-reinforced preforms affects the easiness of production of composite materials and the strength of the resulting products. Accordingly, even though high-strength, high-modulus fibers and resins are used as starting materials, composite materials having excellent strength are not necessarily obtained.

Under such circumstances, proposals have been made to develop high-strength polymer blend composites (molecular composite materials) by finely dispersing rigid polymers such as aromatic polyamides, etc. in matrix resins to a molecular level.

Aromatic polymers suitable for molecular composite materials include those containing heterocyclic repeating units such as thiazole rings, imidazole rings, oxazole rings, oxazinone rings, etc. Among them, aromatic polythiazole having a thiazole ring is highly promising because of its excellent mechanical strength.

In the meantime, the homogeneous dispersion of a reinforcing polymer in a matrix polymer cannot be achieved if the reinforcing polymer is simply blended with the matrix polymer. This means that simple blending fails to provide a molecular composite material having excellent mechanical properties. Therefore, various attempts have been made so far.

For instance, Japanese Patent Laid-Open No. 1-287167 discloses a method of producing a polymer composite comprising the steps of introducing a polymer solution mainly containing (A) a reinforcing polymer consisting of polythiazole having a substantially rod-shaped skeleton and (B) a fusible matrix polymer into a solidification bath, and forming it into a film, the above polymer solution showing an optical anisotropy and being solidified via an apparent, optically isotropic phase after immersion in the solidification bath.

Japanese Patent Publication No. 2-7976 discloses a polymer composition comprising (a) a reinforcing polymer A consisting of polythiazole having a substantially rod-shaped skeleton, and (b) a matrix polymer B consisting of a less-crystallizable aromatic copolyamide having a glass transition temperature of 200° C. or higher and a flow-initiation temperature of 500° C. or lower, a weight ratio of A/(A+B) being 0.15–0.70. When the aromatic copolyamide is kept at a temperature between its glass transition temperature and its flow-initiation temperature for an arbitrary period of time within 5 hours, the resulting crystals have apparent sizes of 2.5 nm or less.

However, in the methods of producing polymer composites as disclosed in Japanese Patent Laid-Open No. 1-287167 and Japanese Patent Publication No. 2-7976, homogeneous dispersions of the reinforcing polymers in matrix polymers are not expected. This means that the resulting molecular composite materials do not show largely improved mechanical strength, etc. This appears to be due to the fact that the rigid reinforcing polymers and the matrix polymers do not show good compatibility with each other, leading to poor dispersibility therebetween.

Thus, proposals have been made to provide a method of producing a molecular composite material of a rigid aromatic polymer, the method comprising the steps of homogeneously mixing a prepolymer of the rigid aromatic polymer and a matrix polymer or its prepolymer in an organic solvent, removing the organic solvent and then heating it so that the rigid aromatic polymer is formed from its prepolymer by a ring closure reaction (Japanese Patent Laid-Open Nos. 64-1760 and 64-1761).

Another proposal has also been made to provide the method of producing a molecular composite material, in which hydrogen atoms of thiol groups of an aromatic polythiazole prepolymer are substituted with alkyl groups to enhance a dispersibility of the aromatic polythiazole in a solvent (Japanese Patent Laid-Open No. 4-114062). By the above methods, molecular composite materials having relatively good mechanical strength, etc. can be produced.

However, these molecular composite materials fail to show sufficiently high dispersibility of the rigid aromatic polymer in the matrix polymer so that the molecular composite materials cannot have a sufficient mechanical strength.

OBJECT AND SUMMARY OF THE INVENTION

Accordingly, an object of the present invention is to provide a method of producing a molecular composite material having excellent mechanical strength, etc. substantially without using an organic solvent.

As a result of intense research in view of the above object, the inventors have found that a molecular composite material containing the rigid aromatic polymer homogeneously dispersed in the matrix polymer can be obtained by dissolving a prepolymer of a rigid aromatic polymer in a liquid monomer of a matrix polymer and heating the mixture to cause a thiazole ring closure reaction of the prepolymer and a polymerization reaction of the monomer. The present invention has been completed based upon this finding.

Thus, the method of producing a molecular composite material comprising a rigid aromatic polymer and a matrix polymer according to the present invention comprises the steps of:

(a) dissolving a prepolymer of the rigid aromatic polymer in a monomer of the matrix polymer to prepare a homogeneous solution; and (b) heating the homogeneous solution to cause a thiazole ring closure reaction of the prepolymer and a polymerization reaction of the monomer simultaneously.

DETAILED DESCRIPTION OF THE INVENTION

[1] Prepolymer of Rigid Aromatic Polymer

A prepolymer of the rigid aromatic polymer used in the method of the present invention is subjected to a ring closure reaction to form a rigid aromatic polymer. The rigid aromatic polymer has aromatic rings in a main chain thereof and condensed rings bonded to one or both sides of each aromatic ring. Such a rigid aromatic polymer may be not only a homopolymer with a repeating unit containing the condensed rings but also a copolymer having such a repeating unit.

(a) Prepolymer of Rigid Aromatic Homopolymer

Rigid aromatic homopolymers have the condensed rings constituted by carbon atoms, and one or more of nitrogen atoms, oxygen atoms and sulfur atoms. The condensed rings include thiazole rings, imidazole rings, oxazole rings, oxazinone rings, etc. Examples of the rigid aromatic homopolymers containing such condensed rings are indicated below.

(1) Polybenzothiazole expressed by the following formula:

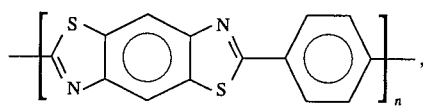

(2) Polybibenzothiazole expressed by the following formula:

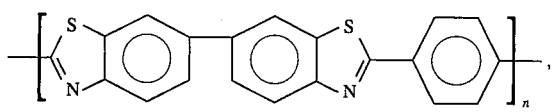

(3) Polybenzoxazole expressed by the following formula:

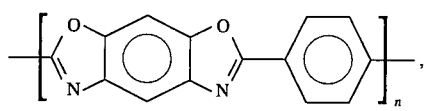

(4) Polybibenzoxazole expressed by the following formula:

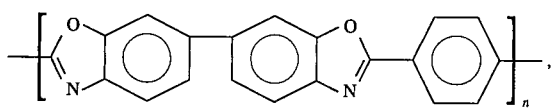

(5) Polybenzimidazole expressed by the following formula:

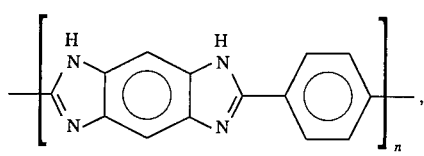

(6) Polybibenzimidazole expressed by the following formula:

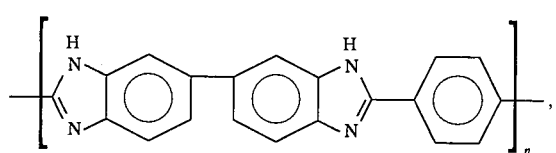

(7) Polybibenzoxazinone expressed by the following formula:

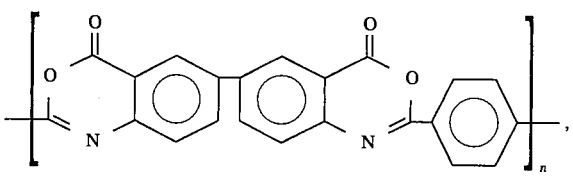

(8) Polybenzimidazolebenzopyrrolone expressed by the following formula:

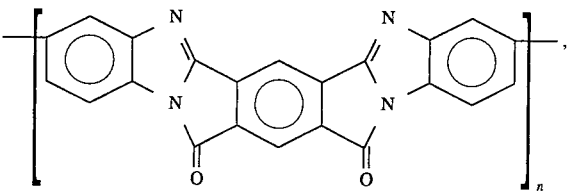

(9) Polybenzimidazolebenzophenanthroline expressed by the following formula:

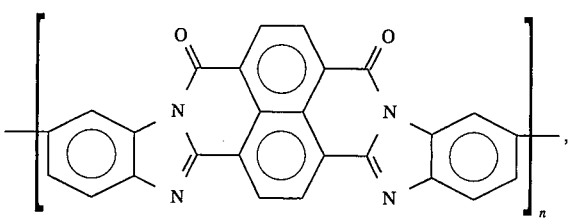

Among them, aromatic polythiazoles containing thiazole rings such as polybenzothiazole, polybibenzothiazole, etc. are preferred. Explanation will be made below on an aromatic polythiazole as an example of the rigid aromatic homopolymer without intending that the invention is limited thereto.

The aromatic polythiazole prepolymer can be obtained by polymerizing an alkyl group-substituted aromatic diaminodithiol compound with a dicarboxylic acid. Specifically, the aromatic polythiazole prepolymer may be produced by the following steps.

(1) Reacting a salt of the aromatic diaminodithiol compound with an alkyl halide in an alkaline aqueous solvent, so that hydrogen atoms of thiol groups of the aromatic diaminodithiol compound are substituted with alkyl groups; and (2) Polymerizing the monomer obtained in the step (1) with the dicarboxylic acid derivative to form the aromatic polythiazole prepolymer.

The above steps will be explained below.

Step (1)

The aromatic diaminodithiol compound is a compound having amino groups and thiol groups on both sides of its aromatic residual group, and the aromatic residual group may be not only a benzene ring but also any aromatic ring in which 2 or more benzene rings are condensed. Further, the aromatic residual group may be those having 2 or more benzene rings bonded to each other, such as biphenyl. The amino groups and the thiol groups on both sides may be bonded to the aromatic residual group symmetrically with respect to its axis or its central point. Typical examples of such aromatic diaminodithiol compounds are:

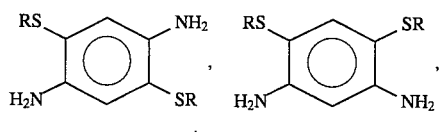

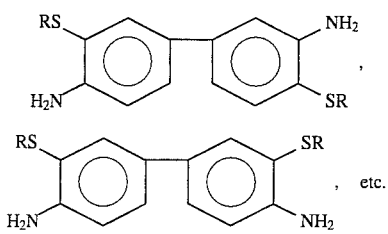

These aromatic diaminodithiol compounds may be used in the form of a salt such as a hydrochloride to prevent their deterioration.

The alkyl groups bonded to the thiol groups of the aromatic diaminodithiol compound are substituted or unsubstituted alkyl groups. The unsubstituted alkyl groups include an isopropyl group, an ethyl group, an n-propyl group, an n-butyl group, a sec-butyl group, a tert-butyl group, etc. Among them, secondary or tertiary alkyl groups are particularly preferable.

The substituted alkyl groups may be the above-described alkyl groups substituted with a carboxyl group, an ester group, a cyano group, a benzyl group, a halogen group, a nitro group, etc. Incidentally, in the case of having such substituent groups, the alkyl groups need not be secondary ones. The substituted alkyl groups include specifically:

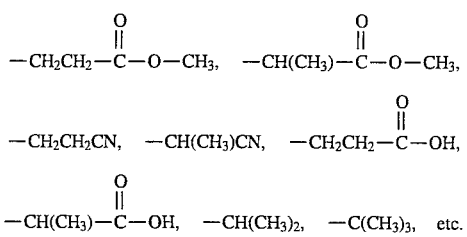

Incidentally, in the case of ester-substituted alkyl groups, alkyl groups bonded to the ester group need not be a methyl group but may be longer linear alkyl groups.

To bond the above alkyl group to the thiol group, the alkyl group is used in the form of a halide, namely an alkyl halide. The halides which may be used in the present invention are bromides, chlorides, iodides, etc. of the above alkyl groups.

The alkaline aqueous solvent used may be water or a mixture of water and alcohol (ethanol and/or methanol) in which an alkaline salt such as sodium hydroxide is dissolved. Incidentally, the alkali concentration in the alkaline aqueous solvent is preferably 30 weight % or less. The substitution reaction can be conducted at a temperature of 0°–100° C. The reaction time is not specifically restricted, but it is generally about 2–24 hours. Incidentally, to accelerate the substitution reaction, the solution is preferably stirred. Also, by using an excess amount of an alkyl halide, the reaction rate and yield can be increased.

When the substitution reaction is performed under the conditions described above, hydrogen atoms of thiol groups of the aromatic diaminodithiol compound can be substituted with alkyl groups, thereby obtaining a desired alkyl-substituted aromatic diaminodithiol compound as a monomer.

Step (2)

The dicarboxylic acid derivatives used in the present invention include those having carboxylic groups substituted as follows:

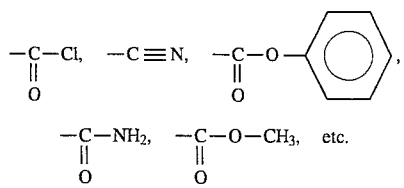

The residual groups of the above dicarboxylic acid derivatives are preferably aromatic groups, and their specific examples are as follows:

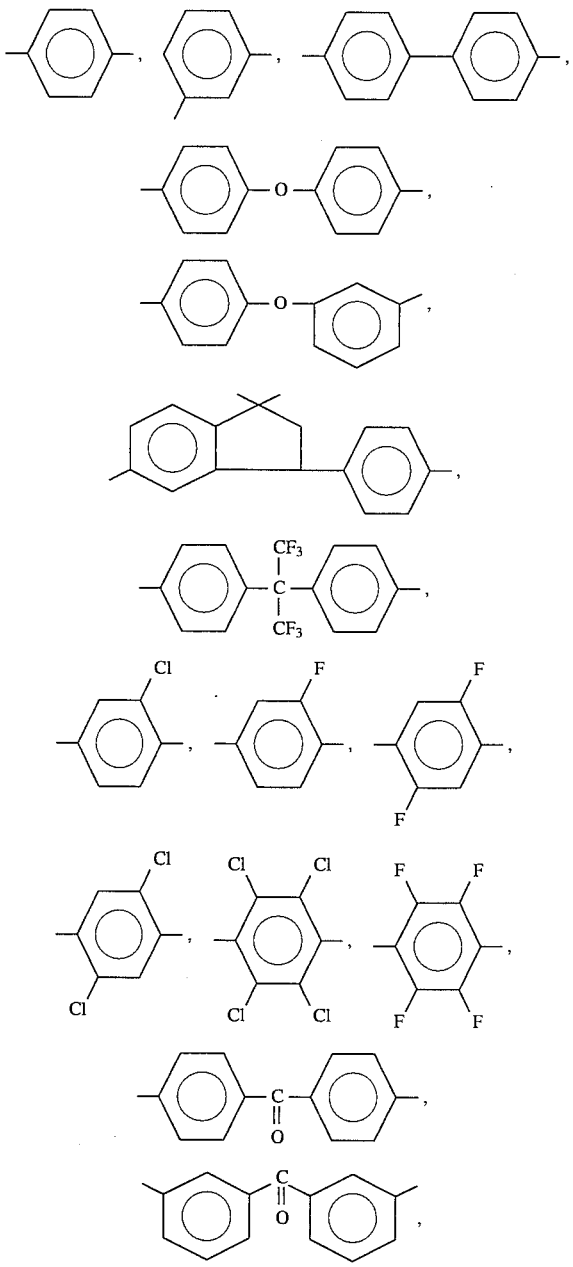

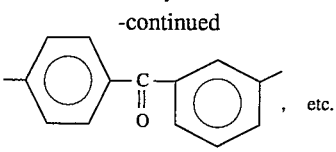, etc.

The most preferred example of such carboxylic acids is 2-chloroterephthalic acid. Incidentally, the dicarboxylic acid derivative may be used alone or in combination.

In the polymerization reaction of the step (2), solvents such as N-methyl-2-pyrrolidone, hexamethyl phosphoric triamide, N,N-dimethylacetamide, etc. may be used alone or in combination. To increase solubility, chlorides such as LiCl, $CaCl_2$, etc. may be added in an amount up to 10%.

The monomer obtained in the step (1) and the dicarboxylic acid derivative are dissolved in the above-described solvent in an equimolar ratio, and subjected to a polymerization reaction at a temperature ranging from −20° C. to +50° C. The monomer concentration is preferably about 0.1–2 mol/liter. The solution is preferably stirred to increase the polymerization reaction rate. The polymerization reaction time is not particularly restricted, but it is generally about 1–24 hours.

By the polymerization reaction under the above-described conditions, the aromatic polythiazole prepolymer having a large polymerization degree can be obtained without causing a ring closure reaction. The resulting aromatic polythiazole prepolymer may be washed and dried by a known method.

The aromatic polythiazole prepolymer obtained by polymerizing the alkyl group-substituted aromatic diaminodithiol compound and the dicarboxylic acid derivative may have the following structure;

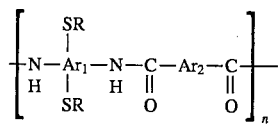

wherein $Ar_1$ and $Ar_2$ represent aromatic residual groups.

In the above, the aromatic polythiazole prepolymer is explained as one example of prepolymers of the rigid aromatic homopolymers. However, other rigid aromatic homopolymers such as those enumerated above may also be used in the form of prepolymers having condensable groups which have not been subjected to a ring closure reaction (refer to Japanese Patent Laid-Open No. 64-001761 ).

(b) Prepolymer of Rigid Aromatic Copolymer

One example of the prepolymer of the rigid aromatic copolymer (hereinafter referred to as "precopolymer") is a prepolymer of an aromatic heterocyclic random copolymer expressed by the following formula:

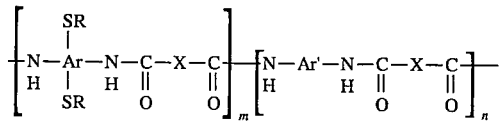

wherein Ar and Ar' are aromatic residues, R is a substituted or unsubstituted alkyl group, X is a residue of the dicarboxylic acid derivative, and "m" and "n" are integers satisfying a ratio (m/n) of 0.01/99.99–99.99/0.01.

The precopolymer may be produced from (a) an aromatic diaminodithiol compound having thiol groups whose hydrogen atoms are substituted with substituted- or unsubstituted-alkyl groups, (b) an aromatic diamino compound and (c) a dicarboxylic acid derivative.

The aromatic diaminodithiol compounds (a) having thiol groups whose hydrogen atoms are substituted with substituted- or unsubstituted-alkyl groups include those used in the production of the rigid aromatic homopolymers mentioned above and can be synthesized by the same method.

The aromatic diamino compounds (b) used are preferably aromatic diamino compounds having flexible (soft) structures. Suitable aromatic diamino compounds include diamines having aromatic residues such as diphenylether, biphenyl, etc. Specific examples of the aromatic diamino compounds (b) include diamines having aromatic residues expressed by the following formulae:

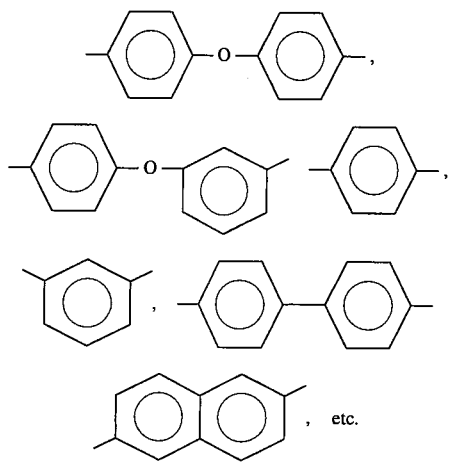, etc.

Suitable dicarboxylic acid derivatives include those used in the production of the rigid aromatic homopolymers mentioned above. Incidentally, the dicarboxylic acid derivatives may be used alone or in combination.

The method of producing the precopolymer is described in detail below.

The aromatic diaminodithiol compound (a), the aromatic diamino compound (b) and the dicarboxylic acid derivative (c) are dissolved at desired proportions in an organic solvent to cause their copolymerization reaction. Preferably, the aromatic diaminodithiol compound (a) and the aromatic diamino compound (b) are first dissolved in the organic solvent to prepare a homogeneous solution to which the dicarboxylic acid derivative is then added.

A ratio of the concentration of the aromatic diaminodithiol compound (a) to that of the aromatic diamino compound (b) in an organic solvent is identical to a ratio of rigid chain moieties to flexible (soft) chain moieties in the aromatic heterocyclic random copolymer, namely the m/n ratio mentioned above. Accordingly, the concentrations of the aromatic diaminodithiol compound (a) and the aromatic diamino compound (b) may be determined properly depending upon the application of the aromatic heterocyclic random copolymers. In the present invention, the compounds (a) and (b) are preferably mixed in such proportions that the ratio (m/n) is in the range of 0.01/99.99–99.99/0.01.

Incidentally, a molar amount of the dicarboxylic acid derivative (c) is identical to or greater than a total molar amount of the aromatic diaminodithiol compound (a) and the aromatic diamino compound (b). On the other hand, a total concentration of the aromatic diaminodithiol compound (a), the aromatic diamino compound (b) and the dicarboxylic acid derivative (c) in the organic solvent is preferably in the range of about 0.1–2 mol/liter. The organic solvents used may be the same as in the production of the rigid aromatic homopolymers.

In the production of the precopolymer from the aromatic diaminodithiol compound (a), the aromatic diamino compound (b) and the dicarboxylic acid derivative (c), the polymerization temperature is preferably from −20° C. to +50° C. In the polymerization reaction, the solution is preferably stirred to increase the polymerization reaction rate. The polymerization reaction time is not particularly restricted, but it is generally about 1–24 hours.

By performing the polymerization reaction under the above conditions, the aromatic polythiazole prepolymer having a large polymerization degree can be obtained without causing a ring closure reaction. The resulting precopolymer has an intrinsic viscosity $\eta_{inh}$ of about 1.0–1.8 (in N-methyl-2-pyrrolidone at 30° C.).

The resulting precopolymer may be washed and dried by a known method. With respect to the details of the precopolymer, refer to Japanese Patent Laid-Open No. 4-351637.

[2] Monomers of Matrix Polymers

Monomers of the matrix polymers used in the present invention (hereinafter referred to as "matrix monomer") are those capable of dissolving the rigid aromatic prepolymers mentioned above and having a high compatibility with the rigid aromatic polymers. The matrix monomers satisfying such requirements include those which can form polyamides, etc.

Examples of the matrix monomers include ε-caprolactam, ζ-enantholactam, ω-caprylolactam, ω-decanolactam, ω-laurolactam, α-pyrrolidone, α-piperidone, etc. These matrix monomers are used alone or in combination.

Preferred matrix monomers are monomers capable of producing aliphatic or aromatic polyamides or copolyamides. One Example of such monomers is a monomer of an aliphatic polyamide having a repeating unit expressed by the following formula:

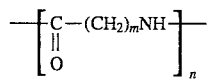

wherein m represents an integer of 3–12. Among the aliphatic polyamides, nylon-6 is particularly preferred. These polyamides have good compatibility with prepolymers of the rigid aromatic polymers, thereby producing molecular composite materials with excellent mechanical strength.

Though the smallest content of the rigid aromatic polymer would be able to exhibit a high reinforcing effect, a weight ratio of the rigid aromatic polymer to the matrix polymer is preferably in the range of 1/99.9 to 50/50. When the proportion of the rigid aromatic polymer as a reinforcing polymer is too high, a density of the rigid aromatic polymer in the molecular composite material becomes so high that the rigid aromatic polymer is likely to be partially aggregated, leading to poor dispersion of the rigid aromatic polymer at a molecular level and deteriorated mechanical strength of the molecular composite material. The weight ratio of the rigid aromatic polymer to the matrix polymer is more preferably in the range of 1/99 to 20/80, particularly 1/99 to 10/90.

[3] Production of Molecular Composite Material

The rigid aromatic prepolymer is homogeneously dissolved in the melted matrix monomer. In this case, the matrix monomer is preferably heated at 68°–200° C. When the temperature is lower than 68° C., the monomer is not melted. On the other hand, when the temperature exceeds 200° C., the monomer is likely to be polymerized. The melting of the monomer is preferably conducted in an atmosphere of an inert gas such as a nitrogen gas, an argon gas, etc. or under a reduced pressure.

A polymerization catalyst may be added to the homogeneous solution of the rigid aromatic prepolymer and the matrix monomer. Suitable polymerization catalysts include water, ε-aminocaproic acid, etc. In the case of using a water as the catalyst, the proportion of water used is 0.1–40 weight % based on the total amount of the homogeneous solution. In the case of using ε-aminocaproic acid as the catalyst, its proportion is not greater than 40 weight %. Further, phosphoric acid may be added to the solution to accelerate the polymerization of the matrix monomer. In this case, the proportion of the phosphoric acid added is not greater than 10 volume %.

Next, the homogeneous solution is heated to 200°–300° C. to subject the rigid aromatic prepolymer to a ring closure reaction (formation of a condensed ring) while polymerizing the matrix monomer. When the temperature is lower than 200° C., the ring closure reaction of the rigid aromatic prepolymer and the polymerization reaction of the matrix monomer do not take place. On the other hand, when the temperature exceeds 300° C., the decomposition of the matrix polymer produced is undesirably initiated. The preferred temperature range is 230°–280° C. Incidentally, the heating of the homogeneous solution may be conducted not only at a constant temperature but by elevating the temperature stepwise. Further, the heating is preferably conducted in an atmosphere of an inert gas such as nitrogen, argon, etc. or in vacuum.

By the heating process, the rigid aromatic prepolymer is subjected to the ring closure reaction. For instance, when an aromatic polythiazole prepolymer is used, the alkyl group (R) are removed from the precopolymer, thereby forming a thiazole ring at that site. As a result, aromatic polythiazole having the following formula is obtained.

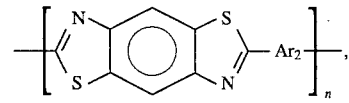

wherein $Ar_2$ represents an aromatic residue.

The ring closure reaction of the rigid aromatic prepolymer takes place simultaneously with the polymerization reaction of the matrix monomer. The rigid aromatic polymer and the matrix polymer thus obtained are dispersed mutually uniformly at a molecular level, thereby forming a molecular composite material having excellent mechanical properties.

The present invention will be described in more detail by way of Examples below.

EXAMPLE 1

0.51 g of a polybenzothiazole prepolymer (hereinafter referred to as "PBT prepolymer") having the structure shown below ($\eta inh$=1.5 at 0.5 g/dl and at 30° C.) and 30 g of liquid ε-caprolactam were placed in a reaction vessel and heated at 110° C. for about 12 hours in an argon atmosphere to obtain a homogeneous solution of the PBT prepolymer in the liquid ε-caprolactam.

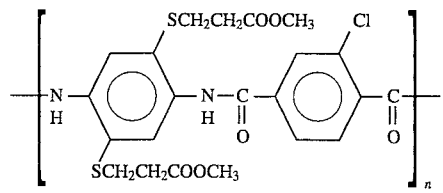

After the PBT prepolymer was completely dissolved in the liquid ε-caprolactam, 6 g of a 50-weight-% aqueous solution of aminocaproic acid as a catalyst was added to the homogeneous solution. The solution was heated to 270° C. and stood for 4 hours in an argon atmosphere to subject the PBT prepolymer to a thiazole ring closure reaction and simultaneously polymerize the liquid ε-caprolactam to produce nylon-6. After cooling and solidifying at room temperature, the reaction product was removed from the reaction vessel and pulverized. The pulverized reaction product was refluxed with water overnight, filtered and dried at 100° C. in vacuum to obtain a pellet-like molecular composite material of 1 weight % of PBT and nylon-6.

2 g of the resulting pellet-like PBT/nylon-6 molecular composite material was compression-molded at 230° C. and 60 kg/cm$^2$ to obtain a sample plate of 15 mm ×50 mm ×2 mm. The sample plate was subjected to a three point-bending test to measure a bending strength and a flexural modulus according to JIS K7203. The measurement results are shown in Table 1.

Further, 0.1 g of the pellet-like PBT/nylon-6 molecular composite material was dissolved in 20 ml of m-cresol to measure an intrinsic viscosity ηinh thereof at 30° C. according to a capillary method. The results are also shown in Table 1.

EXAMPLE 2

1.5 g of the same PBT prepolymer as in Example 1 and 30 g of liquid ε-caprolactam were placed in a reaction vessel and heated at 110° C. for about 12 hours in an argon atmosphere to homogeneously dissolve the PBT prepolymer in the liquid ε-caprolactam.

After the PBT prepolymer was completely dissolved in the liquid ε-caprolactam, 12 g of a 50-weight-% aqueous solution of ε-aminocaproic acid as a catalyst was added to the homogeneous solution, heated to 270° C. and stood for 7 hours in an argon atmosphere to subject the PBT prepolymer to a thiazole ring closure reaction and simultaneously polymerize the liquid ε-caprolactam to produce nylon-6. After cooling and solidifying at room temperature, the reaction product was removed from the reaction vessel and pulverized. The pulverized reaction product was refluxed with water overnight, filtered and dried at 100° C. in vacuum to obtain a pellet-like molecular composite material of 3 weight % of PBT and nylon-6.

2 g of the resulting pellet-like PBT/nylon-6 molecular composite material was molded in the same manner as in Example 1 to obtain a sample plate of 15 mm×50 mm×2 mm. The sample plate was subjected to a three point-bending test to measure a bending strength and a flexural modulus according to JIS K7203. The measurement results are shown in Table 1.

Further, 0.1 g of the pellet-like PBT/nylon-6 molecular composite material was dissolved in 20 ml of m-cresol to measure an intrinsic viscosity ηinh thereof at 30° C. according to a capillary method. The results are also shown in Table 1.

Comparative Example 1

30 g of ε-caprolactam was put in a reaction vessel and heated at 110° C. in an argon atmosphere. 6 g of a 50-weight-% aqueous solution of ε-aminocaproic acid as a catalyst was added to ε-caprolactam. The mixture was heated to 270° C. and stood for 4 hours in an argon atmosphere to subject ε-caprolactam to a polymerization reaction to produce nylon-6. The reaction product was cooled and solidified at room temperature. Thereafter, the reaction product was removed from the reaction vessel and pulverized. The pulverized reaction product was refluxed with water overnight. After filtering, the product was dried at 100° C. in vacuum to obtain a pellet-like nylon-6.

The resulting pellet-like nylon-6 was compression-molded under the same condition as in Example 1 to obtain a sample plate of 15 mm×50 mm×2 mm. The sample plate was subjected to a three point-bending test to measure a bending strength and a flexural modulus according to JIS K7203. The measurement results are shown in Table 1.

Further, 0.1 g of the pellet-like nylon-6 was dissolved in 20 ml of m-cresol to measure an intrinsic viscosity ηinh thereof at 30° C. according to a capillary method. The results are also shown in Table 1.

TABLE 1

| No. | Bending Strength (kgf/mm$^2$) | Flexural Modulus (kgf/mm$^2$) | Intrinsic Viscosity (ηinh) |
| --- | --- | --- | --- |
| Example 1 | 13 | 430 | 0.8 |
| Example 2 | 13 | 499 | 0.8 |
| Comparative Example 1 | 9 | 251 | 1.02 |

As is clear from Table 1, the molecular composite materials of Examples 1 and 2 exhibit improved bending strength and flexural modulus, as compared with nylon-6 of Comparative Example 1. Further, in the molecular composite material of the present invention the rigid aromatic polymer is well dispersed in the matrix polymer.

As described above in detail, according to the present invention, since a rigid aromatic prepolymer is dissolved in a matrix monomer and thereafter the rigid aromatic prepolymer is subjected to a ring closure reaction while polymerizing the matrix monomer, a molecular composite material having the rigid aromatic polymer well dispersed in a matrix polymer and showing an excellent mechanical strength is obtained. Since a solvent is not used in this process, there is no need of having a solvent-removing step, making the production time extremely short.

The molecular composite materials obtained according to the present invention have excellent properties such as mechanical strength, heat resistance, solvent resistance, etc., so that they can be used widely for automobile parts, aircraft parts, space equipment, etc.

What is claimed is:

1. A method of producing a molecular composite material comprising the steps of:

(a) dissolving a prepolymer of an aromatic polymer, said aromatic polymer having at least one condensed ring selected from the group consisting of a thiazole ring, an imidazole ring, an oxazole ring, an oxazinone ring, an imidazolebenzopyrrolone ring and an imidazolebenzophenanthroline ring, in monomers of a matrix polyamide or copolyamide to form a homogeneous solution; and (b) heating said homogeneous solution to simultaneously cause a ring closure reaction of said prepolymer and a polymerization reaction of said monomers, thereby forming said molecular composite material.

2. The method according to claim 1, wherein at least one of said monomers of said matrix polyamide or copolyamide is selected from the group consisting of ε-caprolactam, ζ-enantholactam, ω-caprylolactam, ω-decanolactam, ω-laurolactam, α-pyrrolidone and α-piperidone.

3. The method according to claim 1, wherein a weight ratio of said prepolymer of said aromatic polymer to said monomers of said matrix polyamide or copolyamide is in the range of 0.1/99.9 to 50/50.

4. A method of producing a molecular composite material comprising the steps of:
   (a) melting monomers of a matrix polyamide or copolyamide by heating;
   (b) dissolving a prepolymer of an aromatic polymer, said aromatic polymer having at least one condensed ring selected from the group consisting of a thiazole ring, an imidazole ring, an oxazole ring, an oxazinone ring, an imidazolebenzopyrrolone ring and an imidazolebenzophenanthroline ring, in said molten monomers of said matrix polyamide or copolyamide to form a homogeneous solution; and
   (c) heating said homogeneous solution to simultaneously cause a ring closure reaction of said prepolymer and a polymerization reaction of said monomers, thereby forming said molecular composite material.

5. The method according to claim 4, wherein said monomers of said matrix polyamide or copolyamide are heated at 68°–200° C.

6. The method according to claim 4, wherein said monomers of said matrix polyamide or copolyamide are heated in an atmosphere of an inert gas.

7. The method according to claim 4, wherein the heating step (c) of said homogeneous solution is conducted in the presence of water or ε-aminocaproic acid.

8. The method according to claim 4, wherein a weight ratio of said prepolymer of said aromatic polymer to said monomers of said matrix polyamide or copolyamide is in the range of 0.1/99.9 to 50/50.

9. The method of producing a molecular composite material according to claim 1, wherein the aromatic polymer is a polybenzothiazole or polybibenzothiazole.

10. The method of producing a molecular composite material according to claim 1, wherein the aromatic polymer is a polybenzoxazole or polybibenzoxazole.

11. The method of producing a molecular composite material according to claim 1, wherein the aromatic polymer is a polybenzimidazole or polybibenzimidazole.

12. The method of producing a molecular composite material according to claim 1, wherein the aromatic polymer is a polybibenzoxazinone.

13. The method of producing a molecular composite material according to claim 1, wherein the aromatic polymer is a polybenzimidazolebenzopyrrolone.

14. The method of producing a molecular composite material according to claim 1, wherein the aromatic polymer is a polybenzimidazolebenzophenanthroline.

15. The method of producing a molecular composite material according to claim 4, wherein said monomers of said matrix polyamide or copolyamide are melted at a temperature of from 68° to 200° C.

16. The method of producing a molecular composite material according to claim 1, further comprising adding water or ε-aminocaproic acid to the homogeneous solution of step (a).

17. The method of producing a molecular composite material according to claim 1, further comprising adding phosphoric acid as a polymerization accelerator to the homogeneous solution of step (a).

18. The method of producing a molecular composite material according to claim 1, wherein the homogeneous solution is heated to 200° to 300° C. to simultaneously cause a ring closure reaction of said prepolymer and a polymerization reaction of said monomers.

19. A method of producing a molecular composite material comprising the steps of:
   (a) dissolving a prepolymer of an aromatic polymer in monomers of a matrix polyamide or copolyamide to form a homogeneous solution, said aromatic polymer having at least one condensed ring selected from the group consisting of a thiazole ring, an imidazole ring, an oxazole ring, an oxazinone ring, an imidazolebenzopyrrolone ring and an imidazolebenzophenanthroline ring, and said prepolymer having condensable groups that form said thiazole ring, imidazole ring, oxazole ring, oxazinone ring, imidazolebenzopyrrolone ring and imidazolebenzophenanthroline ring of said aromatic polymer; and
   (b) heating said homogeneous solution to simultaneously cause a ring closure reaction of said prepolymer and a polymerization reaction of said monomers, thereby forming said molecular composite material.

20. A method of producing a molecular composite material comprising the steps of:
   (a) melting monomers of a matrix polyamide or copolyamide by heating;
   (b) dissolving a prepolymer of an aromatic polymer in said molten monomers of said matrix polyamide or copolyamide to form a homogeneous solution, said aromatic polymer having at least one condensed ring selected from the group consisting of a thiazole ring, an imidazole ring, an oxazole ring, an oxazinone ring, an imidazolebenzopyrrolone ring and an imidazolebenzophenanthroline ring, and said prepolymer having condensable groups that form said thiazole ring, imidazole ring, oxazole ring, oxazinone ring, imidazolebenzopyrrolone ring and imidazolebenzophenanthroline ring of said aromatic polymer; and
   (c) heating said homogeneous solution to simultaneously cause a ring closure reaction of said prepolymer and a polymerization reaction of said monomers, thereby forming said molecular composite material.

21. The method according to claim 9, wherein said prepolymer of an aromatic polymer has thiol groups to which substituted or unsubstituted alkyl groups are bonded.

22. The method according to claim 21, wherein said unsubstituted alkyl groups are selected from the group consisting of an isopropyl group, an ethyl group, an n-propyl group, an n-butyl group, a sec-butyl group and a tert-butyl group.

23. The method according to claim 21, wherein said substituted alkyl groups are alkyl groups having substituents, said alkyl groups being selected from the group consisting of an isopropyl group, an ethyl group, an n-propyl group, an n-butyl group, a sec-butyl group and a tert-butyl group, and said substituents being selected from the group consisting of a carboxyl group, an ester group, a cyano group, a benzyl group, a halogen group and a nitro group.

24. A method of producing a molecular composite material comprising the steps of:
   (a) homogeneously mixing an aromatic diaminodithiol compound having thio groups to which substituted or unsubstituted alkyl groups are bonded, with a dicarboxylic acid derivative in an organic solvent, to prepare a prepolymer of an aromatic polymer having thiazole rings;
   (b) dissolving said prepolymer in monomers of a matrix polyamide or copolyamide to form a homogeneous solution of said prepolymer and said matrix monomers; and
   (c) heating said homogeneous solution to simultaneously cause a ring closure reaction of said prepolymer and a polymerization reaction of said matrix monomers, thereby forming said molecular composite material.

25. The method according to claim 24, wherein said unsubstituted alkyl groups are selected from the group consisting of an isopropyl group, an ethyl group, an n-propyl group, an n-butyl group, a sec-butyl group and a tert-butyl group.

26. The method according to claim 24, wherein said substituted alkyl groups are alkyl groups having substituents, said alkyl groups being selected from the group consisting of an isopropyl group, an ethyl group, an n-propyl group, an n-butyl group, a sec-butyl group and a tert-butyl group, and said substituents being selected from the group consisting of a carboxyl group, an ester group, a cyano group, a benzyl group, a halogen group and a nitro group.

* * * * *